(12) United States Patent
Singha et al.

(10) Patent No.: US 11,416,137 B2
(45) Date of Patent: Aug. 16, 2022

(54) SEMANTIC DIMENSIONS IN A USER INTERFACE

(71) Applicant: SAMSUNG ELECTRONICS CO., LTD., Suwon-si (KR)

(72) Inventors: Khaidem Suman Singha, Cachar Assam (IN); Kiran Prasanth Rajan, Trivandrum (IN); Tuhin Chakraborty, Bangalore (IN); Vinayak Pancholi, Udaipur (IN); Saumitri Choudhury, Bangalore (IN); Hallah Zorinsangi, Bangalore (IN); Hema Aravindan, Tamil nadu (IN); Navin N, Chennai (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 27 days.

(21) Appl. No.: 16/123,810

(22) Filed: Sep. 6, 2018

(65) Prior Publication Data
US 2019/0073118 A1 Mar. 7, 2019

(30) Foreign Application Priority Data

Sep. 6, 2017 (IN) .............................. 201741031578
Jun. 5, 2018 (IN) .............................. 201741031578

(51) Int. Cl.
*G06F 3/0481* (2022.01)
*G06F 3/04883* (2022.01)
(Continued)

(52) U.S. Cl.
CPC .......... *G06F 3/04883* (2013.01); *G06F 3/038* (2013.01); *G06F 3/0412* (2013.01);
(Continued)

(58) Field of Classification Search
CPC .... G06F 3/04883; G06F 3/038; G06F 3/0412; G06F 3/04815; G06F 3/0483; G06F 3/04842; G06F 16/00; G06F 16/14
(Continued)

(56) References Cited

U.S. PATENT DOCUMENTS 7,870,140 B2 * 1/2011 Weltman ............... G06F 16/583
707/749
8,977,961 B2 * 3/2015 Vaidya .................. G06F 1/1694
715/708
(Continued)

OTHER PUBLICATIONS

Zhuge, Interactive Semantics, Elsevier 2010, pp. 190-204. (Year: 2010).*
(Continued)

*Primary Examiner* — Alvin H Tan
(74) *Attorney, Agent, or Firm* — Sughrue Mion, PLLC

(57) ABSTRACT

Methods and systems for providing access to contents which are semantically related to a displayed content(s). The access can be provided through a multi-dimensional user interface (UI). The method includes detecting a predefined gesture with respect to a first content. Based on the detected gesture, determining closest semantically linked content (second content). The semantic link between the first content and the second content can be established based on parameters such as sharing history, frequency of usage, type, a location, similarity, hierarchy, key words/phrases, tags, and so on. The semantically linked contents can be assigned onto distinct dimensions of the multi-dimensional UI space. The multi-dimensional UI space can be traversed through different dimensions using the predefined gesture, and each traversal from one dimension to another can be semantically linked.

8 Claims, 18 Drawing Sheets

(51) Int. Cl.
*G06F 3/04842* (2022.01)
*G06F 3/041* (2006.01)
*G06F 3/038* (2013.01)
*G06F 16/00* (2019.01)
*G06F 3/0483* (2013.01)
*G06F 3/04815* (2022.01)

(52) U.S. Cl.
CPC ........ *G06F 3/0483* (2013.01); *G06F 3/04815* (2013.01); *G06F 3/04842* (2013.01); *G06F 16/00* (2019.01)

(58) Field of Classification Search
USPC .......................................................... 715/863
See application file for complete search history.

(56) References Cited

U.S. PATENT DOCUMENTS

| | | | |
|---|---|---|---|
| 9,448,704 B1 | 9/2016 | Belhumeur et al. | |
| 10,083,238 B2* | 9/2018 | Paris | G06F 3/04842 |
| 10,332,297 B1* | 6/2019 | Vadodaria | G06F 3/0486 |
| 10,423,303 B1* | 9/2019 | Roach | G06F 3/0482 |
| 2001/0056427 A1* | 12/2001 | Yoon | G06F 16/78 |
| 2007/0174270 A1* | 7/2007 | Goodwin | G06F 16/951 |
| 2008/0140619 A1* | 6/2008 | Srivastava | G06F 16/27 |
| 2009/0076887 A1* | 3/2009 | Spivack | G06Q 30/0273 |
| | | | 705/14.69 |
| 2011/0072000 A1* | 3/2011 | Haas | G06F 16/9535 |
| | | | 707/709 |
| 2013/0085847 A1* | 4/2013 | Dyor | G06F 16/957 |
| | | | 705/14.49 |
| 2013/0091462 A1 | 4/2013 | Gray et al. | |
| 2013/0097501 A1 | 4/2013 | Jiang | |
| 2013/0117111 A1* | 5/2013 | Dyor | G06F 3/0481 |
| | | | 705/14.54 |
| 2013/0161381 A1* | 6/2013 | Roundtree | G06F 16/9535 |
| | | | 235/375 |
| 2013/0179783 A1 | 7/2013 | Woods et al. | |
| 2013/0268873 A1* | 10/2013 | Saint-Loubert-Bie | H04M 1/72561 |
| | | | 715/764 |
| 2014/0149893 A1* | 5/2014 | Raichelgauz | G06F 17/2235 |
| | | | 715/760 |
| 2014/0157166 A1* | 6/2014 | Choi | G06F 3/04817 |
| | | | 715/769 |
| 2014/0181645 A1* | 6/2014 | Macbeth | G06F 3/04815 |
| | | | 715/249 |
| 2014/0244266 A1* | 8/2014 | Brown | G10L 15/22 |
| | | | 704/275 |
| 2014/0372402 A1* | 12/2014 | Chiu | G06F 16/951 |
| | | | 707/706 |
| 2015/0185982 A1* | 7/2015 | Hicks | G06F 3/0483 |
| | | | 715/776 |
| 2015/0331852 A1* | 11/2015 | Rylov | G06F 40/242 |
| | | | 704/9 |
| 2015/0347532 A1 | 12/2015 | Shaw et al. | |
| 2015/0363066 A1* | 12/2015 | Lemay | G06F 3/04842 |
| | | | 345/173 |
| 2016/0054915 A1* | 2/2016 | Lynch | G06F 16/285 |
| | | | 715/765 |
| 2016/0103586 A1* | 4/2016 | Greenberg | G06F 3/0488 |
| | | | 715/739 |
| 2017/0046523 A1* | 2/2017 | Sathish | H04W 12/08 |
| 2017/0094360 A1 | 3/2017 | Keighran et al. | |
| 2017/0220226 A1* | 8/2017 | Wu | G06F 3/04817 |
| 2017/0228127 A1* | 8/2017 | Mukherjee | G06F 9/451 |
| 2017/0329490 A1* | 11/2017 | Esinovskaya | G06F 3/0488 |
| 2018/0300771 A1* | 10/2018 | Roger | G06F 16/958 |

OTHER PUBLICATIONS

Communication dated Dec. 13, 2018 by the International Searching Authority in counterpart International Patent Application No. PCT/KR2018/010368. (PCT/ISA/210).

Communication dated Aug. 4, 2020 by the Indian Patent Office in counterpart Application No. 201741031578.

* cited by examiner

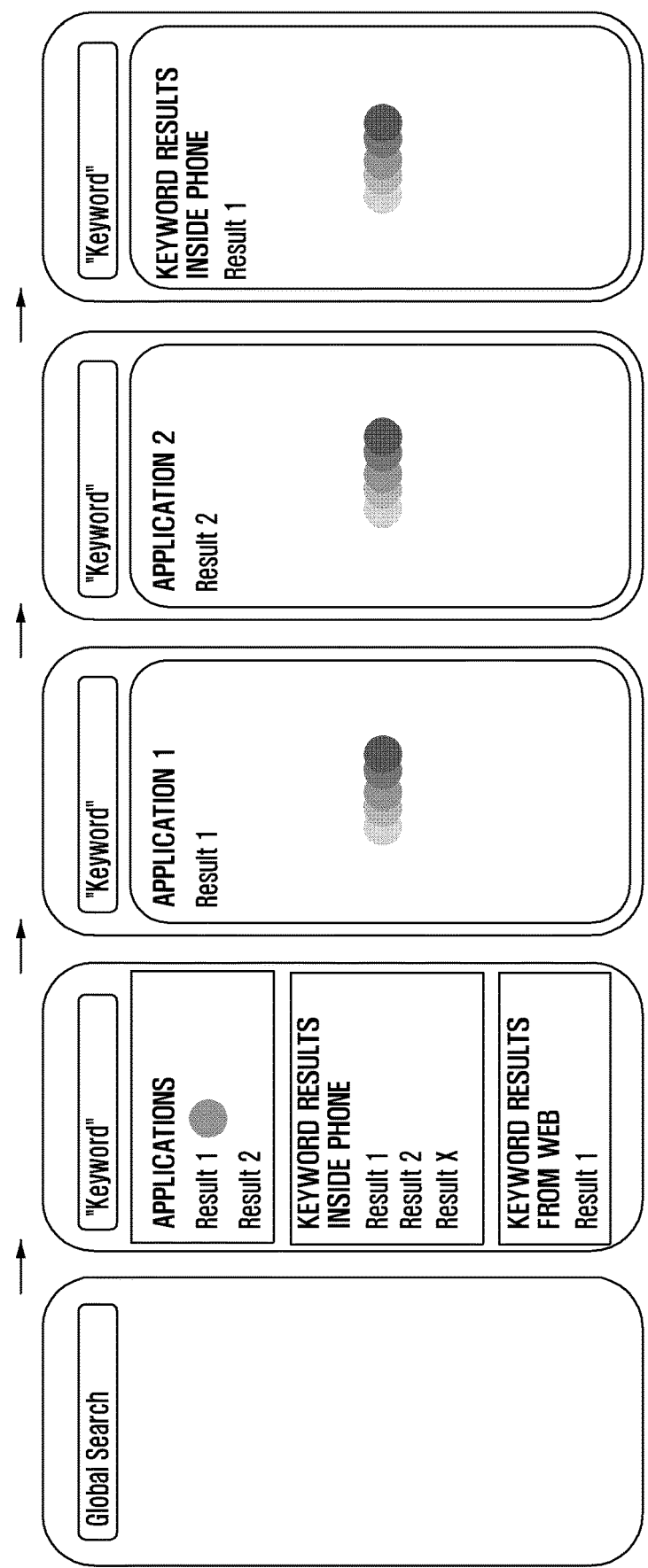

Current – March 2017

Switch to – March 2016

SEMANTIC DIMENSIONS IN A USER INTERFACE

CROSS-REFERENCE TO RELATED APPLICATION(S)

This application is based on and claims priority under 35 U.S.C. § 119(a) to Indian Provisional Patent Application No. 201741031578, filed on Sep. 6, 2017, and to Indian Non-Provisional Patent Application No. 201741031578, filed on Jun. 5, 2018, in the Indian Patent Office, the disclosures of which are incorporated by reference herein in their entireties.

BACKGROUND

1. Field

The disclosure relates to information retrieval, and more particularly, to methods and systems for providing access to semantically related content(s) in a multi-dimensional user interface.

2. Description of Related Art

Currently, a user needs to navigate back and forth between multiple information sources, such as applications, services, and so on, while trying to access contents, which may be semantically linked to each other. Ease of navigation across the applications and/or services for fetching the contents depends on understanding of arrangement of the contents within multiple information sources and accessibility methods, as defined in a User Interface (UI) through which the contents can be accessed.

Currently, there may not be a well defined/standardized spatial model as a basic framework for content segregation and access. The user needs to mentally create a spatial model of the UI, in which the semantically related contents are integrated. The user can interact and visualize the spatial model for fetching the contents. The mental model of the UI is often ambiguous, complex and subjective to each user's ability and interest in abstract visualization.

The above information is presented as background information only to assist with an understanding of the present disclosure. No determination has been made, and no assertion is made, as to whether any of the above might be applicable as prior art with regard to the present disclosure.

SUMMARY

Provided are methods and systems to provide access to at least one content, which is semantically related to a displayed content.

In accordance with an aspect of the disclosure a multi-dimensional User Interface (UI) is provided in which each dimension includes content semantically related to content included in another dimension. The semantically related contents can be accessed by traversing through the multi-dimensional UI using gestures.

According to an aspect of the disclosure, methods and systems are provided which provide access to content(s) that are semantically related to a displayed content. The access can be provided through a multi-dimensional User Interface (UI). A method includes detecting a first predefined gesture with respect to a first content displayed on a first dimension of a multi-dimensional UI associated with the electronic device. Further, the method includes determining at least one second content semantically linked to the displayed first content (nearest or closest semantically linked content). The semantic link is established based on at least one parameter and the at least one parameter is a type of content, relevance, visual similarity, hierarchy, information architecture, frequency of usage, a location, key words, phrases, and tags. Further, the method includes displaying the second content in a second dimension of the multi-dimensional UI.

Embodiments of the disclosure provide an electronic device for accessing content(s), which are semantically related to a displayed content. The access can be provided through a multi-dimensional User Interface (UI). The electronic device includes a gesture recognition unit configured to detect a first predefined gesture with respect to a first content displayed on a first dimension of a multi-dimensional UI. The first predefined gesture may be implemented via a touch of the first content on a touch screen display or may be executed on a portion of the display which depicts the first content. Further, the electronic device includes a semantic search engine configured to determine at least one second content semantically linked to the displayed first content (nearest or closest semantically linked content). The semantic link is established based on at least one parameter and the at least one parameter is a type of content, relevance, visual similarity, hierarchy, information architecture, a frequency of usage, a location, key words, phrases, and tags. Further, the electronic device includes a UI interface configured to display the second content in a second dimension of the multi-dimensional UI.

Additional aspects will be set forth in part in the description which follows, and in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A-6D are views illustrating establishing semantic relationships based on relevance, according to an embodiment;

DETAILED DESCRIPTION

Figure 1:
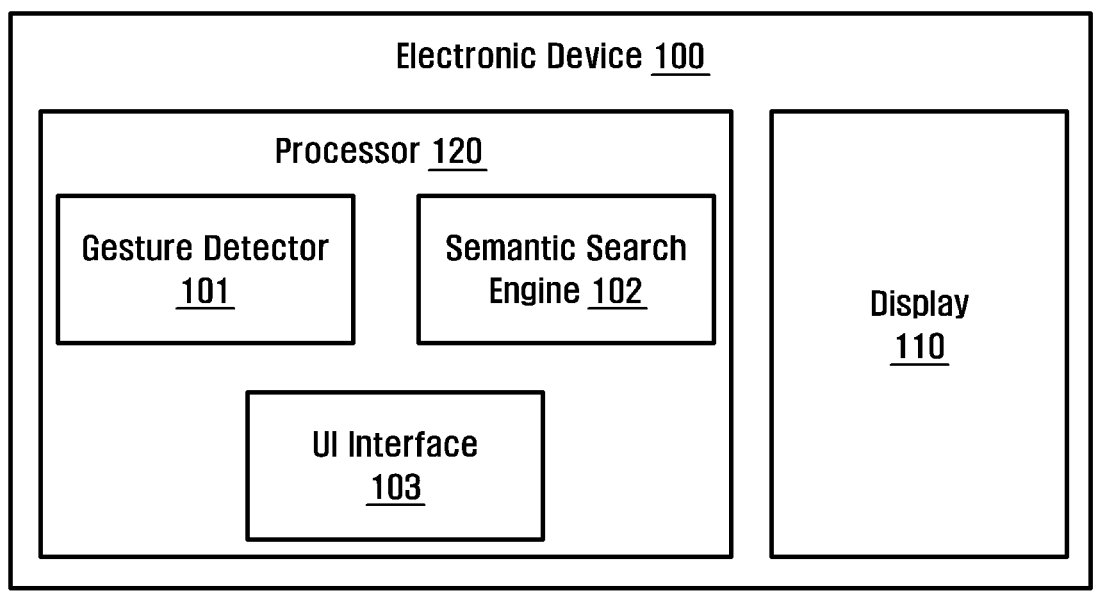
FIG. 1 is a block diagram illustrating a configuration of an electronic device for providing access to contents, which are semantically linked with a displayed content, according to an embodiment.

The embodiments herein and the various features and advantageous details thereof are explained more fully below with reference to the accompanying drawings. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the disclosure herein.

Embodiments herein disclose methods and systems for providing access to at least one content, which is semantically related to a displayed content. The access can be provided through a multi-dimensional User Interface (UI). The embodiments include detecting a predefined gesture on a displayed content (first content). Based on the detected gesture, the embodiments include determining at least one nearest semantically linked content (second content). The semantic link between the first content and the second content can be established based on parameters such as type of content, frequency of usage, relevance, location, visual similarity, information architecture, hierarchy, keywords/phrases, tags, and so on. The parameters can be a part of the semantics of the first content and the second content. Further, if the predefined gesture is detected on the second content, a third content is determined, which is the nearest semantically linked content to the second content.

The semantically linked contents can be accessed through a multi-dimensional UI on an electronics device. The semantically linked contents can be assigned onto distinct planes (dimensions). The UI can be visualized in a multi-dimensional space; for example, the UI can be visualized in a 2D, 2.5D or 3D space. Content, objects, data, and so on, can be assigned to the UI semantically onto the distinct planes. The multi-dimensional UI space and that can be traversed through the different dimensions using the predefined gesture, and each traversal from one dimension to another can be semantically linked.

Referring now to the drawings, and more particularly to FIGS. 1 through 8B, where similar reference characters denote corresponding features consistently throughout the figures, there are shown embodiments.

FIG. 1 is a block diagram illustrating a configuration of an electronic device 100 for providing access to contents, which are semantically linked with a displayed content, according to an embodiment. Examples of the electronic device 100 can be, but not limited to, mobile phones, smart phones, tablets, laptops, computers, wearable devices, IoT (Internet of Things) devices, Virtual Reality (VR), Augmented Reality (AR) devices, vehicle infotainment systems, smart televisions, and so on.

The electronic device 100 can include a display 110 and a processor (or at least one processor) 120. The processor 120 can include a gesture detector 101, a semantic search engine 102, and a UI interface 103. The gesture detector 101 can detect a plurality of gestures to trigger specific functionalities. The gesture detector 101 can detect a plurality of gestured based on the user touch inputs detected by the touch screen formed on or integrated with the display. In an embodiment, the gesture detector 101 can detect a first predefined gesture and a second predefined gesture. The first predefined gesture can be used to trigger a semantic search and the second predefined gesture can be used for accessing semantically linked contents in one of the dimensions of a multi-dimensional UI, which are fetched from the semantic search. In an embodiment herein, a single pre-defined gesture can be used to trigger the semantic search and accessing the semantically linked contents in one of the dimensions of the multi-dimensional UI (based on the search).

On detecting the first predefined gesture, the semantic search engine 102 can perform the semantic search. Consider that a first content is displayed on the display 110 of the electronic device 100. The semantic search engine 102 of the processor 120 is configured to determine the contents, which are semantically linked with the first content. The semantic search engine 102 can determine the semantically linked contents. The links between the first content and the determined semantically linked contents can be established based on semantics such as content type, relevance, frequency of usage, location, visual similarity, hierarchy, information architecture, key words/phrases, tags, and so on.

The semantically linked content(s) can be accessed through the UI interface 103. The UI interface 103 may be software that is executable by the processor 120 or may be a hardware component separate from the processor 120. The semantically linked content can be assigned to one of the dimensions of a multi-dimensional UI space. According to an embodiment, each dimension can display the same type of content (such as videos, images, documents, media, and so on). The results of the semantic search, performed by the semantic search engine 102 i.e., the semantically linked contents can be accessed in a sequential order by performing the second predefined gesture. In an embodiment, the order (or priority) can be based on the nearness of a semantically linked content to the first content. In an embodiment, the order can be based on at least one user preference. The nearness of a semantically linked content can depend on contextual relation of the first content with the semantics. The UI interface 103 can display the semantically linked contents in one of the dimensions of the multi-dimensional UI space on a display associated with the electronic device 100, on the gesture detector 101 detecting the second predefined gesture. According to an embodiment, the UI interface 103 can select and display one second content with the highest priority (or most related to the first content) among the plurality of second contents when a plurality of second contents, linked to the first content, is identified. In this state, when a second predefined gesture is detected, the second content with the next priority can be displayed. The UI interface 103 can keep the data of the other second contents in the memory while displaying one of the second contents.

Consider that a content (second content), which is semantically linked to the first content, is displayed in one of the dimensions (a first dimension) of the multi-dimensional UI space. If the user performs the first predefined gesture on the second content, a semantic search can be performed. This can result in determining a third content, which can be displayed on another dimension (a second dimension) of the multi-dimensional UI space. The contents within the second dimension that are semantically linked with the second content can be accessed by performing the second predefined gesture.

FIG. 1 is a block diagram illustrating a configuration of the electronic device 100 according to an embodiment, but it is to be understood that other embodiments are possible and FIG. 1 is provided by way of an example and not by way of a limitation. In other embodiments, the electronic device 100 may include less or more number of components. Further, the labels or names of the components are used only for illustrative purposes and do not limit the scope of the disclosure. One or more components can be combined together to perform same or substantially similar function in the electronic device 100.

Figure 2:
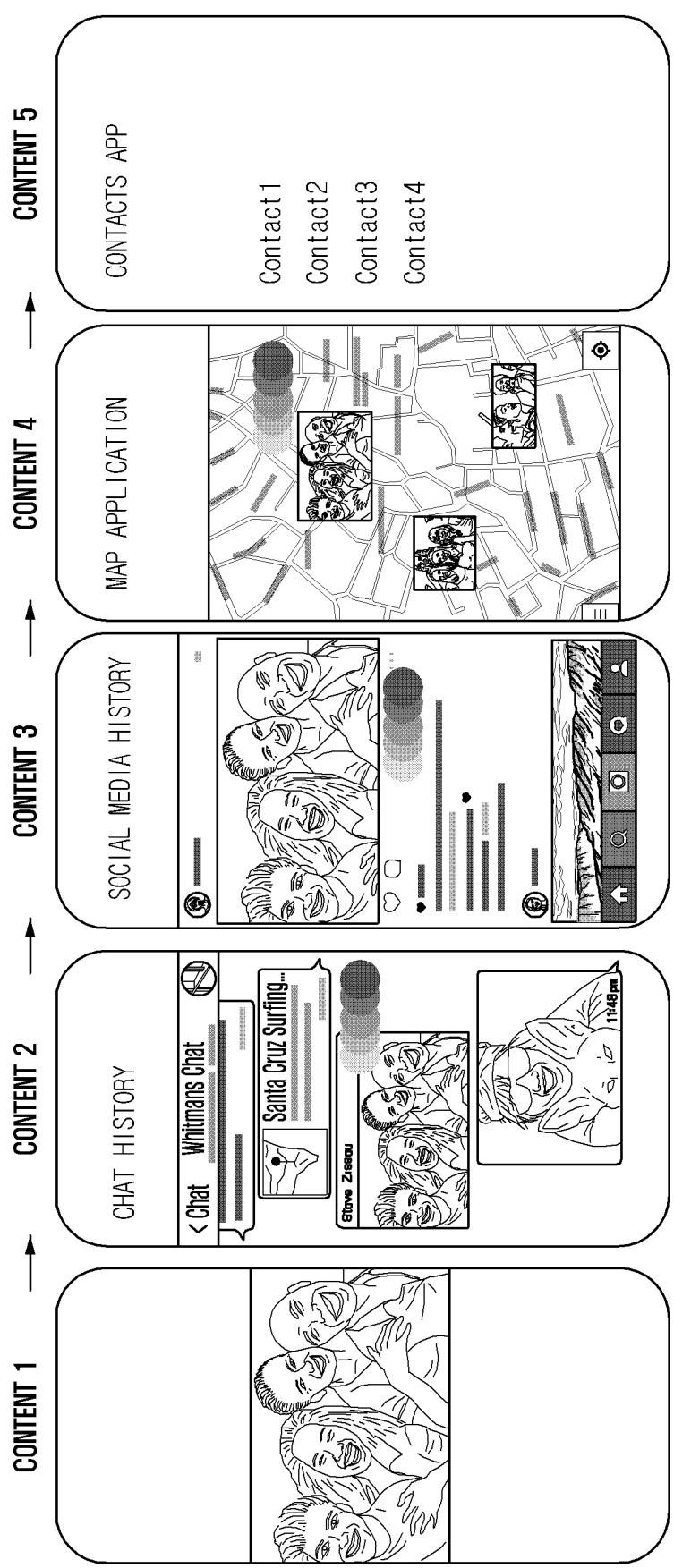
FIG. 2 is a view illustrating semantically linked contents based on predefined user gestures, according to an embodiment.

FIG. 2 is view illustrating semantically linked contents based on predefined user gestures, according to an embodiment. As depicted in FIG. 2, initially the UI interface 103 displays content 1 on the display 110 of the electronic device 100. The content 1 is an image, which can be accessed through an image application. The gesture detector 101 can detect a first predefined gesture from a user. In an embodiment, the first predefined gesture can be long press and swipe, but is not limited thereto. For example, the first predefined gesture can include various gestures such as a double tap, a single long touch, and a multi touch. In addition, when the first content is touched, a predefined menu is displayed and the search for the second content that is semantically linked in the menu is triggered. According to various embodiments, when the first predefined gesture is a long press and swipe, a long press for more than a predetermined time, a long press on a designated (i.e., an edge of the first content), or a swipe in a designated direction is recognized as a first predefined gesture.

The first predefined gesture can be configured to trigger the semantic search engine 102 to perform a semantic search, which determines contents that are semantically linked with the content 1. The semantic search engine 102 can execute a semantic search from the data of the applications installed in the electronic device 100 or execute a semantic search in an external website using a web browser, etc. The search results, i.e., the semantically linked contents, can be sorted for display in an order (or priority) based on semantic closeness to the content 1. For example, the semantic search engine 102 can identify an image, video, or GIF file that includes an image similar to the image of the first content. Thereafter, the semantically linked contents can be displayed in a first dimension in the multi-dimensional UI space. In this case, the first content can be displayed in a dimension in the multi-dimensional UI space that is different from the first dimension. The semantically linked contents can be accessed sequentially using a second predefined gesture, in an order based on the closeness to the content 1. In an embodiment, the second predefined gesture can be a swipe gesture. The second predefined gesture can be a gesture substantially vertical (e.g., an upward swipe or a downward swipe) or a gesture to a direction (e.g., left or right) of the swipe of the first predefined gesture.

On detection of the first predefined gesture, the semantic search engine 102 can determine content 2 and content 3 as the semantically linked contents. The content 2 can be a chat history in which the image is located and the content 3 can be a social media history in which the image is located. The content 2 can be the closest semantically linked content to the content 1 in comparison to the content 3. The UI interface 103 can display the content 2 on the first dimension of the multi-dimensional UI space. In this case, the UI interface 103 can generate information about the content 3, which is another linked content, in a background. Upon detection of the second predefined gesture, the UI interface 103 can display the content 3 on the first dimension of the multi-dimensional UI space.

When the user performs the first predefined gesture with respect to the content 3, a semantic search is triggered. Content 4, which is the closest semantically linked content to the content 3 is determined and displayed in a second dimension of the multi-dimensional UI space. The content 4 can indicate the places, which were visited on the trip during which the image was captured.

When the user performs the first predefined gesture with respect to the content 4, a semantic search is triggered. Content 5, which is the closest semantically linked content to the content 4 is determined and displayed in a third dimension of the multi-dimensional UI space. The content 5 can provide the contact numbers of the subjects tagged in the image.

Figure 3:
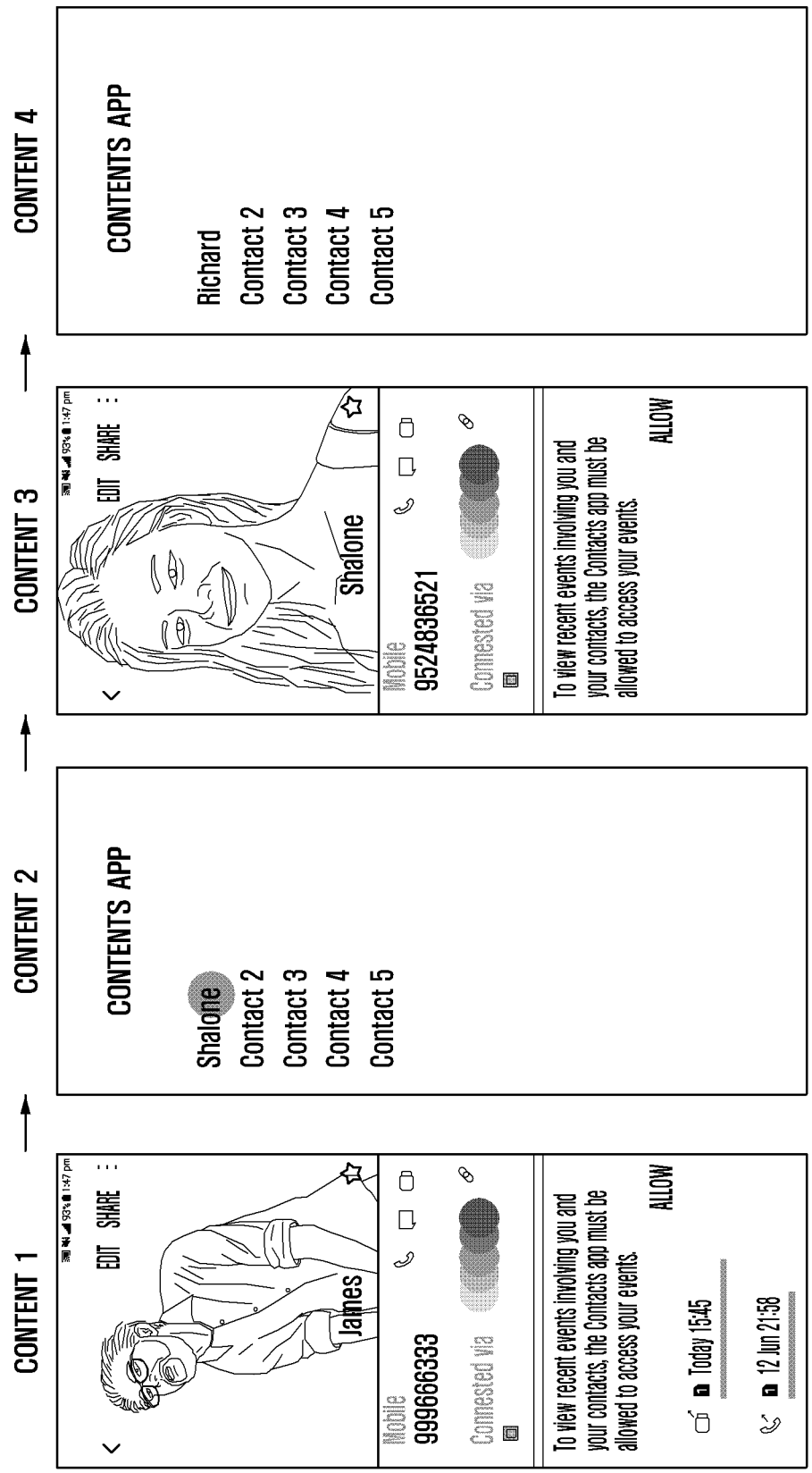
FIG. 3 is a view illustrating another example of semantically linked contents based on the predefined user gestures, according to an embodiment.
Figure 4A:
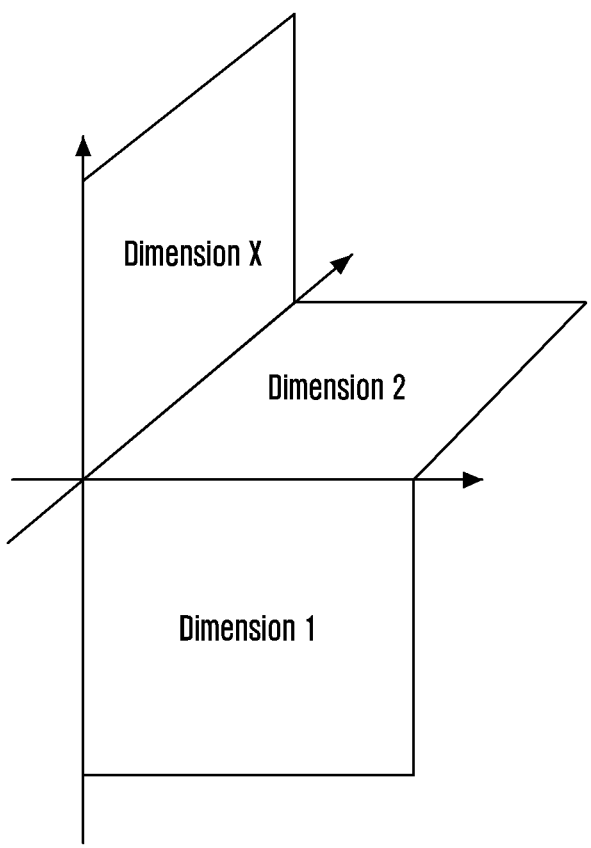
FIGS. 4A-4E are views illustrating examples of arrangement of dimensions in a multi-dimensional User Interface (UI) space for accessing semantically linked contents, according to an embodiment.
Figure 4B:
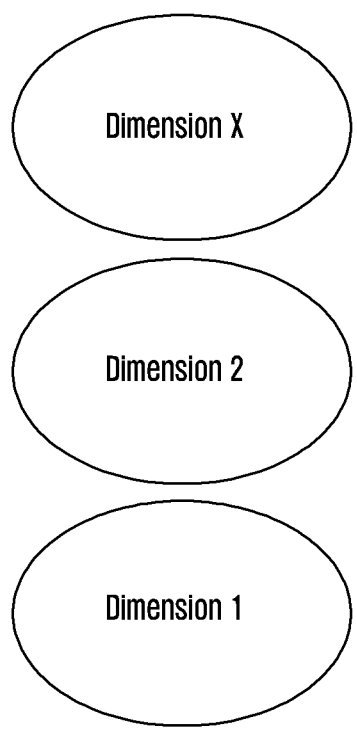
Figure 4C:
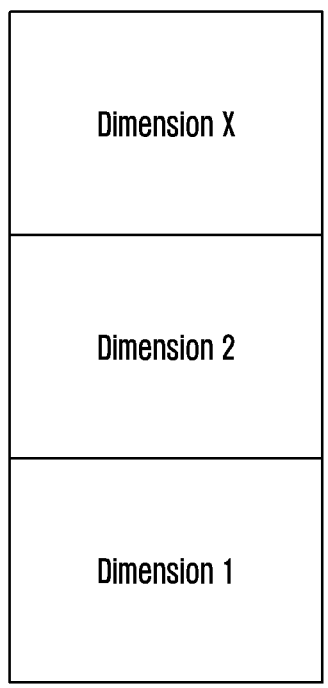
Figure 4D:
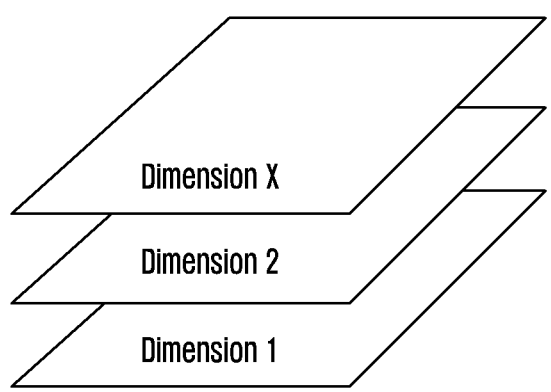
Figure 4E:
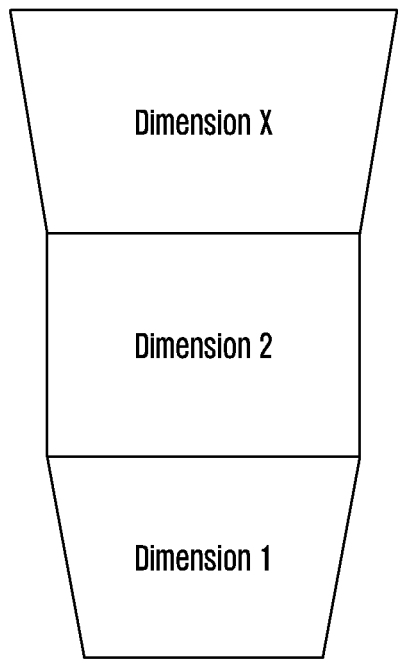

FIG. 3 is a view illustrating semantically linked contents based on the predefined user gestures, according to an embodiment. As depicted in FIG. 3, initially the UI interface 103 can display content 1 on the display 110 of the electronic device 100. The content 1 can be contact details of a subject 'James', which can be accessed through contact application. The gesture detector 101 can detect the first predefined gesture from the user.

The first predefined gesture can trigger a semantic search to determine contents, which can be semantically linked to the contact details of the subject James. For example, the semantic search engine 102 can identify if there are many calls or messages with James from the contact list at a similar time (e.g., office hours, dinner time, etc.) or at the exact time (e.g., hour, day), if the same message is transmitted, if there is content similar to the stored details of the contact, and contacts of the same group. The UI interface 103 can display the nearest semantically linked content, on a first dimension of the multi-dimensional UI. The nearest semantically linked content is content 2, which is a contact list. The contact list can be generated (a semantic link is established) based on common social groups in which James and the subjects in the contact list are included.

Consider that the user performs a touch gesture (or selects) on the contact list, Shalone, who is one of the subjects in the contacts list. The contact details pertaining to the subject Shalone, i.e., content 3, are displayed on the display 110. If the user performs the first predefined gesture with respect to contact 3, the semantic search engine 102 can determine content 4 as the closest semantically linked content to content 3. The content 4 can be a contact list. The contact list can be generated (a semantic link is established) based on common social groups, which include Shalone and the subjects in the contact list. The UI interface 103 can display the content 4 in a second dimension of the multi-dimensional UI.

FIGS. 4A-4E are views illustrating various arrangements of dimensions in a multi-dimensional UI space for accessing semantically linked contents, according to an embodiment. The embodiment includes assigning the determined semantically linked contents in different dimensions of the depicted standardized spatial models for the UI development. The spatial models can enable logical, natural, and intuitive user interaction, and content consumption.

The determined semantically linked contents can be UI elements, UI objects, and so on, that are displayed in different dimensions of the multi-dimensional UI space. As depicted in FIG. 4, all dimensions can be unique and each dimension can exist simultaneously along with all the other dimensions. The dimensions can be visualized in any form, shape, or size. The dimensions can be distinct planes along different axes or layers that can be stacked one above the other. Each dimension can include a plurality of contents and the contents are scrollable.

Each dimension can be semantically linked to another dimension. It can be possible to traverse from one dimension to another if there is a semantic relationship existing between the dimensions. The semantic relationships can be established based on a type of content (such as videos, images, documents, media, and so on), relevance (such as types of search results from application to text, and so on), similar informational architecture and hierarchy (same month but different year), usage (such as frequency of sharing with the particular contact), location, visual similarity between the types of contents, key words/phrases, tags, and so on.

Figure 5A:
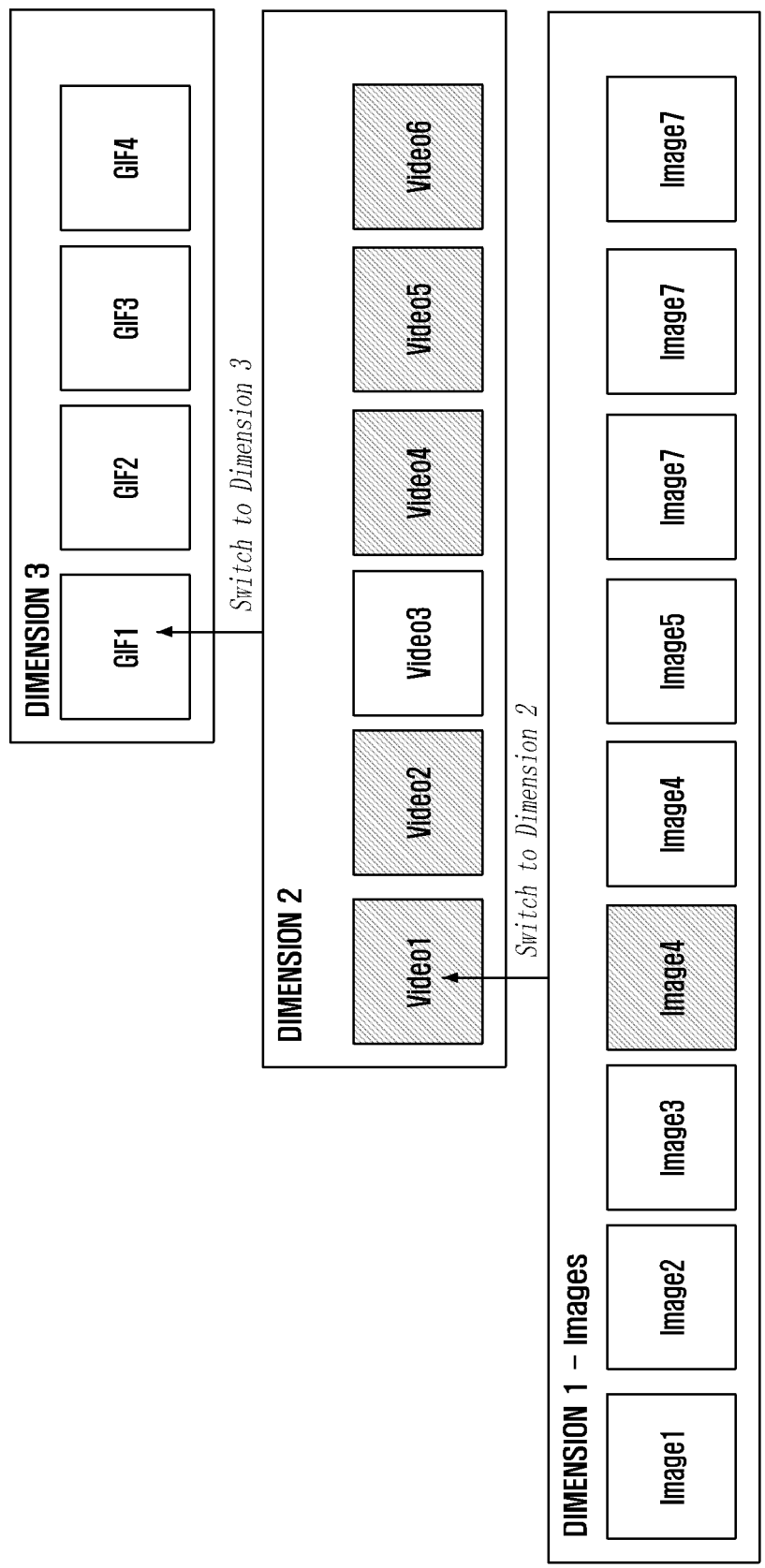
FIGS. 5A and 5B are views illustrating establishing of semantic relationships based on type of content, according to an embodiment.
Figure 5B:
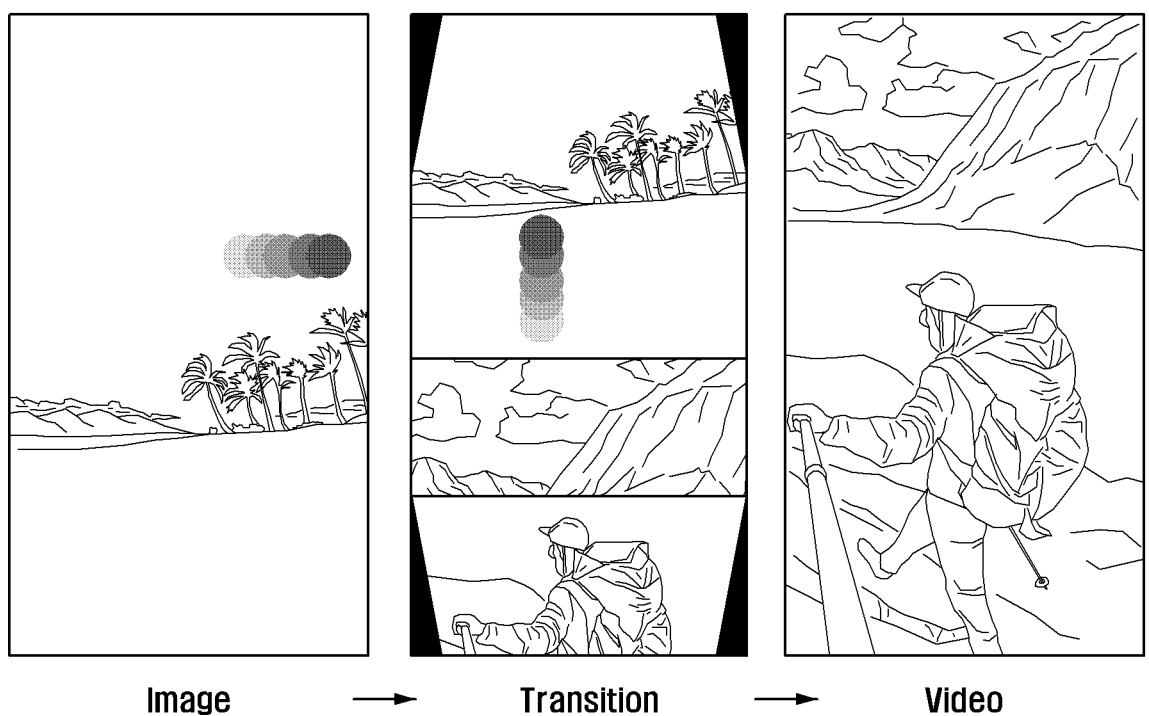

FIGS. 5A and 5B are views illustrating establishing semantic relationships based on a type of content, according to an embodiment. As depicted in FIG. 5A, different types of content can be included in different dimensions of the multi-dimensional UI space. Consider in an example that the UI space comprises of three dimensions. A user can browse across the different dimensions to access the different types of contents, which include images, videos, and GIFs. The different types of contents can have semantic connections between them.

When the user performs the first predefined gesture on a displayed content, a semantic search can be triggered. For example, the device can determine a plurality of images (image 1-image 7). The images are semantically linked with the displayed content. The semantic links can be established based on parameters such as relevance, time, place, people, key words/phrases, tags, and so on. It can be considered that the image 1 is the semantically linked content, which is closest to the displayed content. The image 1 can be displayed in the dimension 1. The images e.g., image 2-image 7, can be accessed in a sequential manner by performing the second gesture.

When the user performs the first gesture on an image 4, a semantic search can be triggered. An embodiment includes determining a plurality of videos (video 1-video 6). The videos are semantically linked with the image 4. It can be considered that the video 1 is the semantically linked content, which is closest to the image 4. The video 1 can be displayed in a second dimension (dimension 2). The videos e.g., video 2-video 6, can be accessed in a sequential manner by performing the second gesture.

When the user performs the first gesture on a video 3, a semantic search can be triggered. An embodiment includes a device determining a plurality of GIFs (GIF 1-GIF 4). The GIFs are semantically linked with the video 3. It can be considered that the GIF 1 is the semantically linked content, which is nearest to the video 3. The GIF 1 can be displayed in a third dimension (dimension 3). The GIFs e.g., GIF 2-GIF 4, can be accessed in a sequential manner by performing the second gesture. There could be additional dimensions, based on the type of content.

As depicted in FIG. 5B, the user can perform a first predefined gesture on the image. The first predefined gesture can be a long press and a swipe. The long press and the swipe can trigger a semantic search, to determine a semantically linked content. The semantically linked content can be determined based on a visual similarity. The semantically linked content can be a video, which is having visual similarity with the image. It can be noted that prior to displaying the video, a content can be displayed on the display 110, indicating a transition from the image to the video. The transition may be a cubical transition, and may be displayed momentarily. An embodiment includes displaying the video in one of the dimension of the multi-dimensional UI space.

Figure 6A:
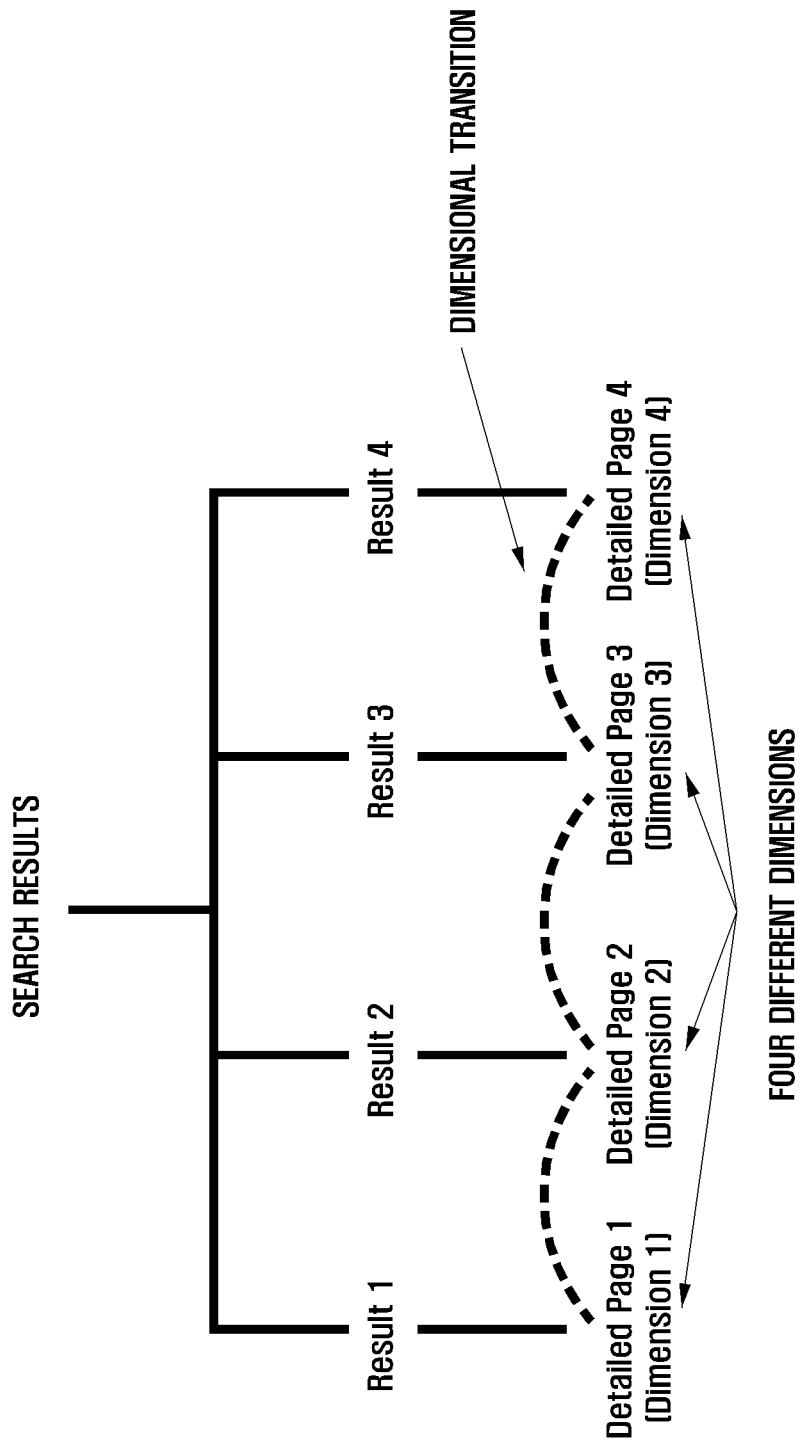

FIGS. 6A-6D are views illustrating establishing semantic relationships based on relevance, according to an embodiment. Consider that the user enters a search query for which a list of search results is generated. As depicted in FIG. 6A, the list can include four search results, in which the user opens result 3. If the user desires to check any of the other search results without going back to the display 110 displaying the search results, the user can perform the first predefined gesture to trigger a semantic search. The semantic search causes retrieval of the original search results, since the original search results are relevant to each other based on the search query. It can be considered that the semantically linked search result, which is nearest to result 3, is displayed in one of the dimensions of the multi-dimensional UI space. Each search result can be accessed in a different dimension of the multi-dimensional UI space. The user can trigger a semantic search in each dimension to navigate to another search result in another dimension.

FIG. 6B is a view illustrating a navigation, by a user, across search results of a global search, according to an embodiment. All search results can be semantically linked by a search keyword. The user can open a particular result and then switch to the detailed view of the next search result seamlessly by performing the first gesture.

Figure 6C:
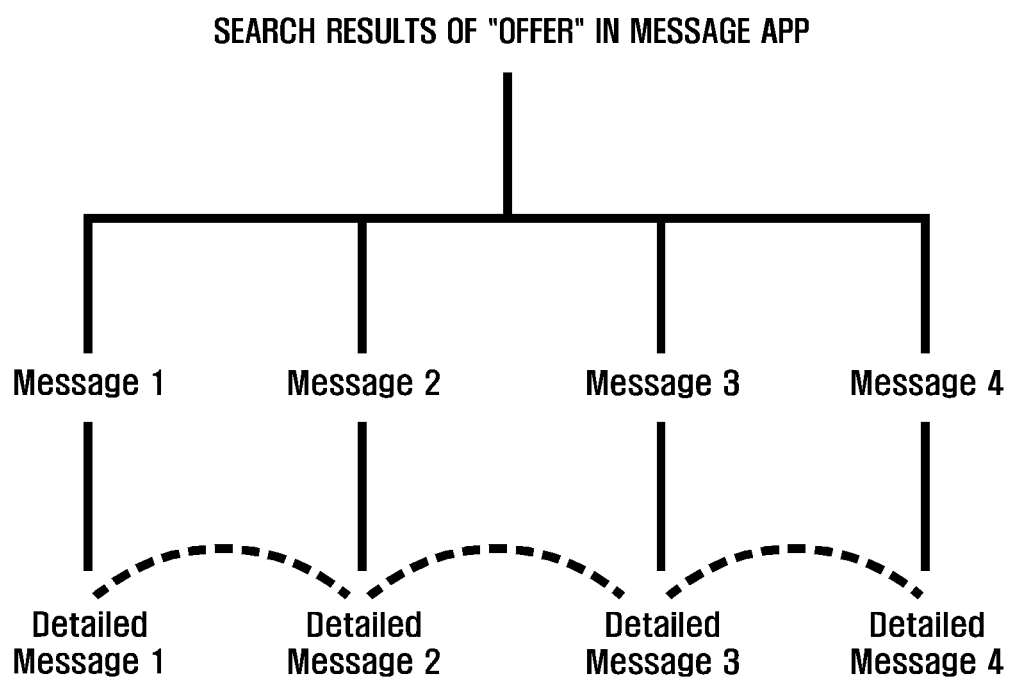
Figure 6D:
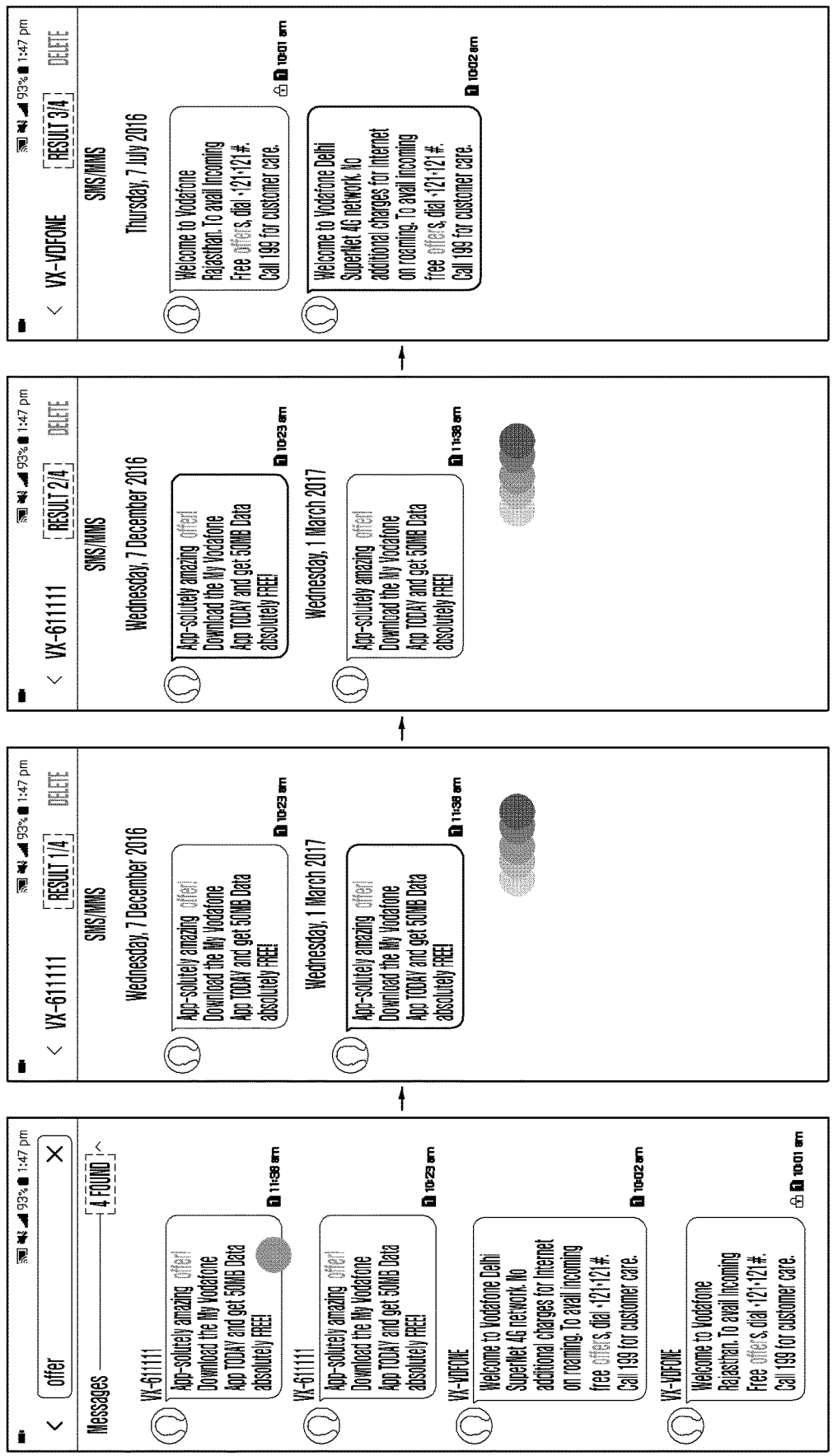

FIGS. 6C and 6D are views illustrating a navigation, by a user, across search results in a messaging application according to an embodiment. In the messaging application, the user can search for a word 'offer', as shown in FIG. 6C. As depicted in FIG. 6D, a page with multiple results (messages including the keyword 'offer') can be displayed to the user. The user can open any one of the results and the result/associated details can be displayed. If the user desires to check the other messages without going back to the page displaying the messages including the keyword 'offer', the user can perform the first predefined gesture to trigger a semantic search. The semantic search results in retrieval of messages including the keyword 'offer'. It can be considered that the semantically linked message, which is nearest to the displayed message, is displayed in a dimension of the multi-dimensional UI space. The user view the other messages including the keyword 'offer' using dimensional transitions by triggering semantic search in each dimension.

Figure 7A:
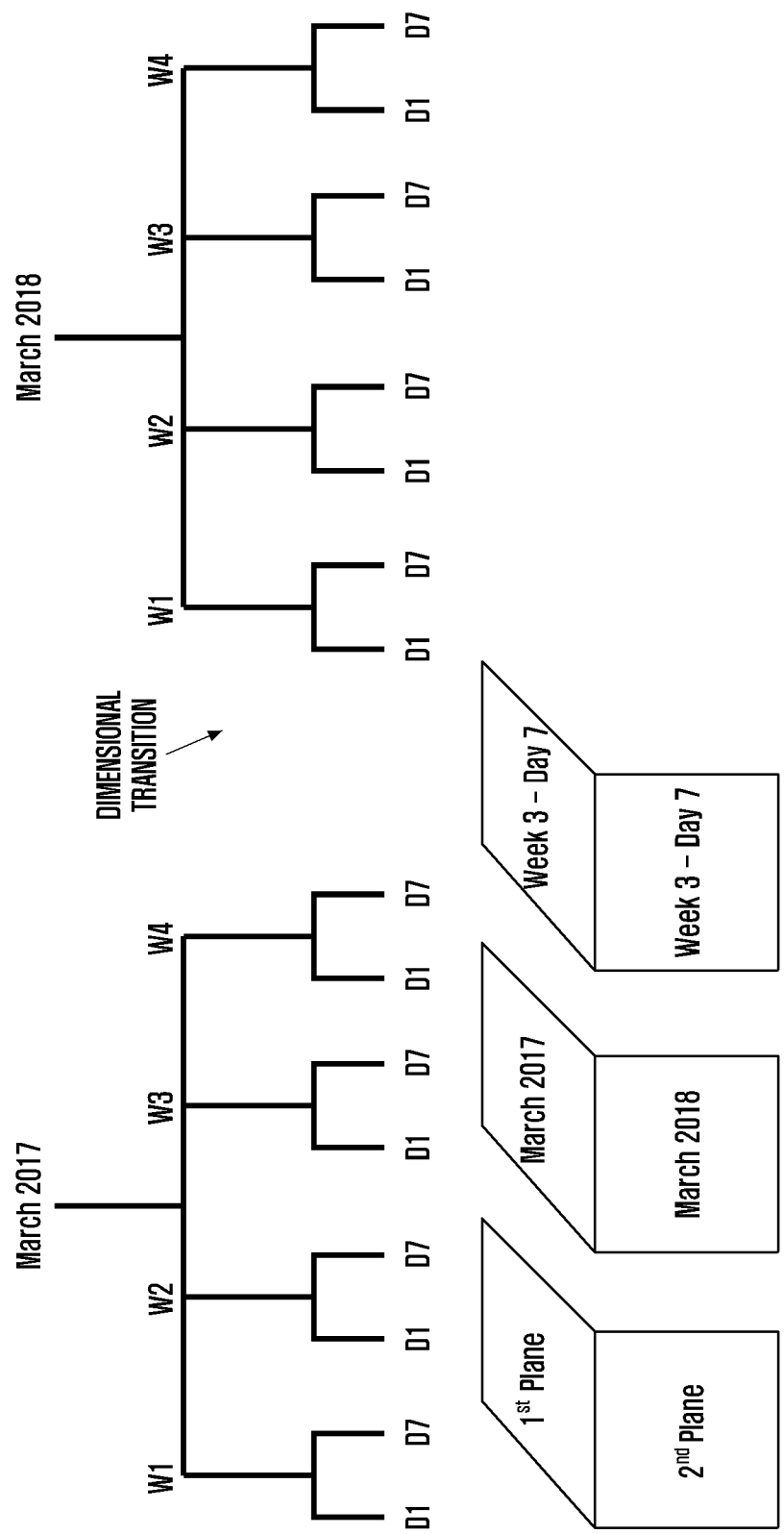
FIGS. 7A and 7B are views illustrating establishing semantic relationships based on similarity in information architecture and hierarchy in an application, according to an embodiment.
Figure 7B:
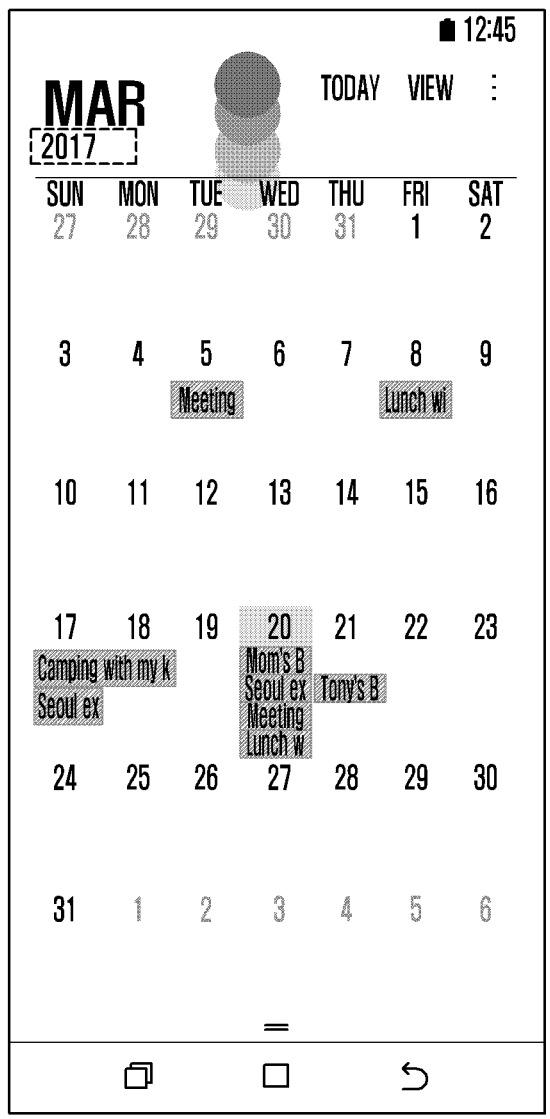
Figure 7B:
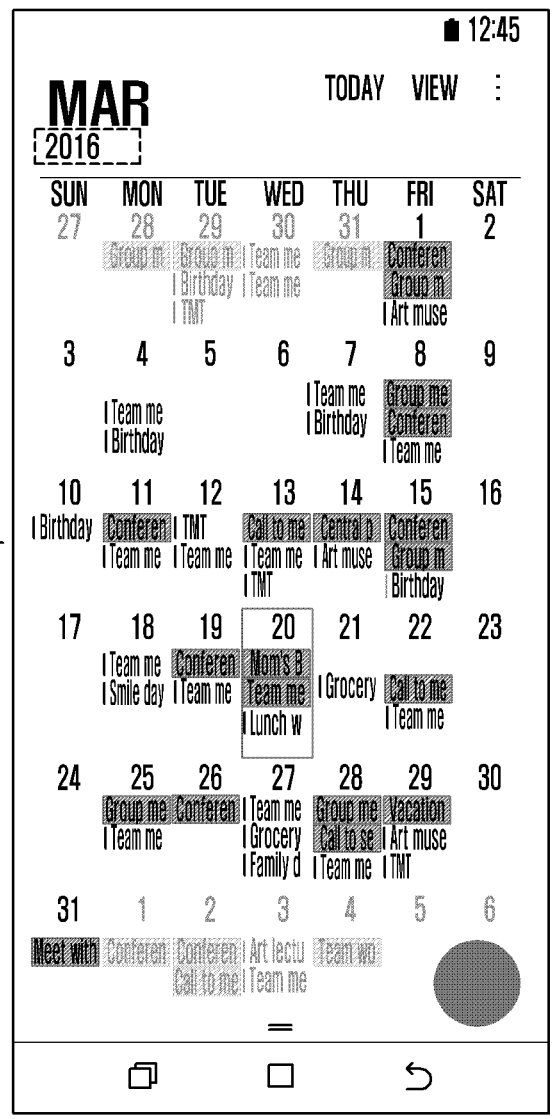

FIGS. 7A and 7B is a view illustrating establishing semantic relationships based on a similarity in information architecture and hierarchy in an application, according to an embodiment. FIG. 7A illustrates an immediate switch between patterns or structures with similar information architecture. Consider that in a calendar application, the user can view events of a particular day of a month in a particular year, and switch immediately to view events of exact same day of the same month in the previous year or following year by triggering a semantic search. The similarity in information architecture can refer to the day, month, and year of consecutive years. The hierarchy can be visualized as year on top of the hierarchy, followed by month, week, and day of a particular year.

The events of the previous year or following year can be viewed in a first dimension of the multi-dimensional UI space. The events of the particular day of the month in the particular year can be semantically linked with the events of the previous year or following year on the same day and same month. For example, consider an event in March 2017 is viewed initially. The semantically linked event, determined as nearest or closest to the event in March 2017, occurred in March 2016 can be displayed in the first dimension. Similarly, by triggering a semantic search again, the user can view an event, which occurred in March 2015 in a second dimension; considering that the event, which occurred in March 2015 as the semantically linked event nearest or closest to the event which occurred in March 2016.

As depicted in FIG. 7B, the first dimension can hold information of the event, which occurred in March 2017. When there is a dimensional shift to the second dimension on the user performing the first gesture, the information type is same, but there is a change in the displayed content (information of the event which occurred in March 2016) due to a change in parameters that define the second dimension. Here, the change is caused by the year, which is different in different dimensions. It can also be possible to define the dimension by the month or week as the parameter.

Figure 8A:
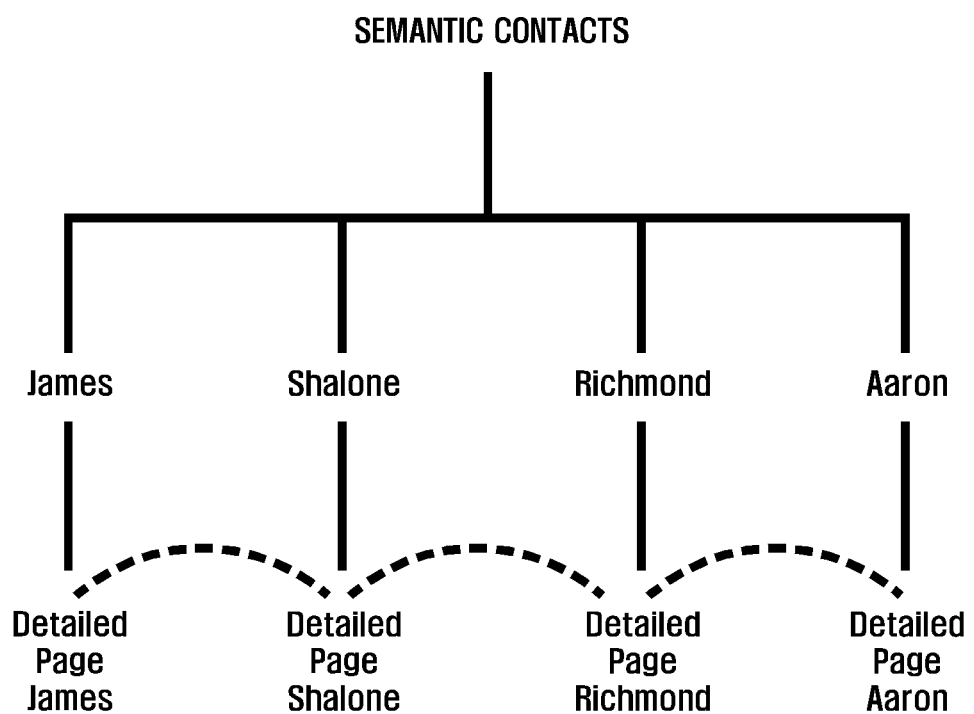
FIGS. 8A and 8B are views illustrating establishing semantic relationships based on usage and priority in an application, according to an embodiment.
Figure 8B:
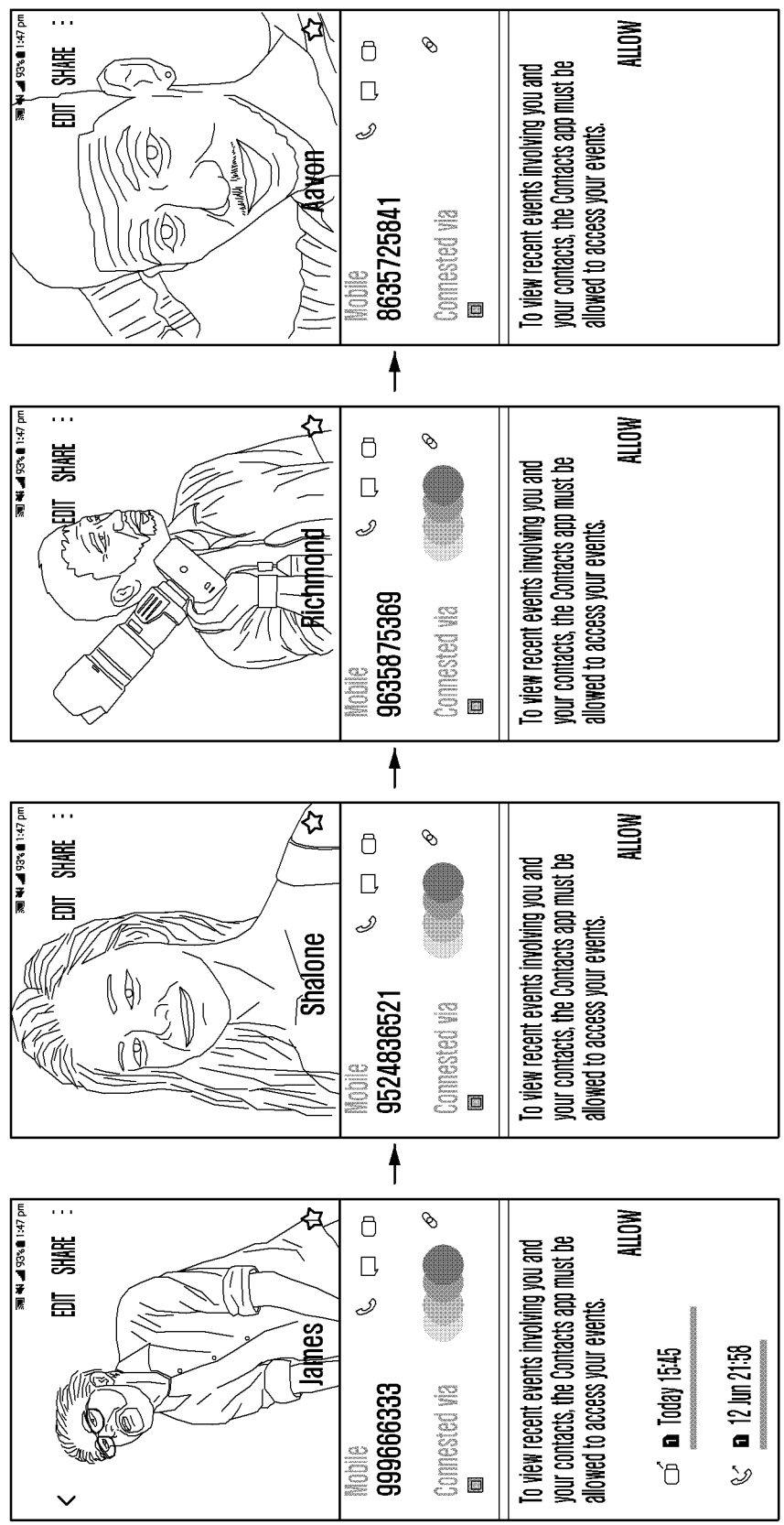

FIGS. 8A and 8B are views illustrating establishing semantic relationships based on usage and priority in an application, according to an embodiment. In an embodiment, consider a contacts application, which includes a plurality of contacts e.g., James, Shalone, Richmond, and Aaron. At an instant, the user can view detailed page of a first contact. By triggering a semantic search through performance of the first predefined gesture on the detailed page of the first contact, semantically linked contacts can be displayed in a first dimension of the multi-dimensional UI. The semantic link between the contacts can be based on usage such as frequency of calls between the contacts, sharing between the contacts, recently called contacts, and so on.

The semantically linked contact, closest to the detailed page of the first contact (second contact) can be initially displayed. The rest of the semantically linked contacts within the first dimension can be accessed by performing the second predefined gesture. On performing the first predefined gesture on one of the semantically linked contacts in the first dimension, semantic search can be triggered again and a semantically linked contact, nearest to the detailed page of the contact currently displayed in the first dimension, can be displayed in the second dimension.

As depicted in FIG. 8B, initially contact details of James can be displayed. When the first predefined gesture is detected on the contact details of James, a semantic search can be triggered to determine semantically linked contacts nearest or closest to James. The closest semantically linked content can be Shalone. The contact details of Shalone can be displayed in the first dimension. If the user performs the first predefined gesture on contact details of Shalone, semantic search can be triggered to determine semantically linked contents closest to Shalone. The closest semantically linked content can be Richmond. The contact details of Richmond can be displayed in the second dimension. If the user performs the first predefined gesture on contact details of Richmond, semantic search can be triggered to determine semantically linked contents closest to Richmond. The closest semantically linked content can be Aaron. The contact details of Aaron can be displayed in the third dimension.

Embodiments can be implemented through at least one software program running on at least one hardware device and performing network management functions to control the network elements. The network elements shown in FIG. 1 include blocks, which can be at least one of a hardware device, or a combination of a hardware device and a software module.

Embodiments describe methods and systems for providing access to contents, which are semantically related to a displayed content. The access can be provided through a multi-dimensional UI. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means, which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the embodiments will so fully reveal the general nature of the embodiments herein that others can, by applying current knowledge, readily modify and/or adapt for various applications such embodiments without departing from the generic concept, and, therefore, such adaptations and modifications should and are intended to be comprehended within the meaning and range of equivalents of the embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. An electronic device comprising:
a display; and
at least one processor configured to:
control the display to display a first image on a first layer corresponding to a first application as a full screen;
based on a first predefined gesture on the display being detected while the first image is displayed, identify a plurality of contents linked with the first image;
control the display to change from the first layer to a second layer corresponding to a second application, the second layer comprising a second image having a highest priority among the plurality of contents, and the second image including the first image or a video including at least part of the first image, wherein the plurality of contents are linked with the first image based on a parameter, wherein the parameter comprises at least one of a type of content, relevance, visual similarity, hierarchy, information architecture, frequency of usage, a location, key words, phrases, or tags;
based on a second predefined gesture on the display being detected while the second image is displayed, identify a third layer comprising a third image having a priority next to the second image, among the plurality of contents linked with the first image, based on the parameter, and the third image including the first image or a video including at least part of the first image; and
change from the second layer displayed on the display to the third layer corresponding to a third application,
wherein the second application and the third application are different from the first application, wherein the at least one processor is further configured to:
display the first image by changing attributes of the first image according to parameters of the second layer when the first image is displayed in the second layer, and
display the first image by changing the attributes of the first image according to parameters of the third layer when the first image is displayed in the third layer, and
wherein the attributes comprise a size and a position.

2. The electronic device, as claimed in claim 1, wherein
the first image displayed in the first layer is generated on a first dimension of a multi-dimensional user interface (UI) related to the first application,
the second image displayed in the second layer is generated on a second dimension of the multi-dimensional UI, and
the third image displayed in the third layer is generated on a third dimension of the multi-dimensional UI related to the third application.

3. The electronic device, as claimed in claim 2, wherein the at least one processor is further configured to:
in response to the first predefined gesture being detected while the second image is displayed, identify a fourth image linked to the second image; and
control the display to display the fourth image in a fourth dimension of the multi-dimensional UI.

4. The electronic device, as claimed in claim 1, wherein the at least one processor is further configured to:
identify, as the second image, at least one additional content which comprises a text of the first image, based on the first image being the text.

5. The electronic device, as claimed in claim 1, wherein the first predefined gesture comprises a touch gesture with respect to the first image and a swipe gesture in a predefined direction.

6. A method of accessing contents on an electronic device, the method comprising:
displaying a first image on a first layer corresponding to a first application;
based on a first predefined gesture on a display being detected while the first image is displayed, identifying a plurality of contents linked with the first image;
changing, when the first image is displayed in a second layer, from the first layer displayed on the display to the second layer corresponding to a second application, attributes of the first image according to parameters of the second layer, the second layer comprising a second image, the second layer comprising a second image having a highest priority among the plurality of contents, and the second image including the first image or a video including at least part of the first image, wherein the plurality of contents are linked with the first image based on a parameter, wherein the parameter comprises at least one of a type of content, relevance, visual similarity, hierarchy, information architecture, frequency of usage, a location, key words, phrases, or tags;

based on a second predefined gesture on the display being detected while the second image is displayed, identifying a third layer comprising a third image including at least part of the first image or a video including at least part of the first image, and the third image having a priority next to the second image, among the plurality of contents linked with the first image, based on the parameter; and changing, when the first image is displayed in the third layer by changing from the second layer to the third layer corresponding to a third application, attributes of the first image according to parameters of the third layer, wherein the second application and the third application are different from the first application, and wherein the attributes comprise a size and a position.

7. The method, as claimed in claim 6, wherein the first image displayed on the first layer is generated on a first dimension of a multi-dimensional user interface (UI) related to a first application, the second image displayed on the second layer is generated on a second dimension of the multi-dimensional UI related to a second application, and the third image displayed in the third layer is generated on a third dimension of the multi-dimensional UI related to the third application.

8. The method, as claimed in claim 7, further comprising:
in response to the first predefined gesture being detected while the second image is displayed, identifying a fourth image linked to the second image; and
displaying the fourth image in a fourth dimension of the multi-dimensional UI.

* * * * *